(12) United States Patent
Plevyak et al.

(10) Patent No.: US 6,848,005 B1
(45) Date of Patent: Jan. 25, 2005

(54) SELF-TUNING DATAFLOW I/O CORE

(75) Inventors: John Plevyak, San Francisco, CA (US); Vikas Jha, San Leandro, CA (US); Ivry Semel, San Francisco, CA (US); Peter Mattis, Belmont, CA (US); Brian Totty, Foster City, CA (US); Eric Brewer, Berkeley, CA (US)

(73) Assignee: Inktomi Corporation, San Mateo, CA (US)

( * ) Notice: Subject to any disclaimer, the term of this patent is extended or adjusted under 35 U.S.C. 154(b) by 652 days.

(21) Appl. No.: 09/829,873

(22) Filed: Apr. 9, 2001

Related U.S. Application Data (62) Division of application No. 09/159,468, filed on Sep. 23, 1998, now Pat. No. 6,308,214.

(51) Int. Cl.[7] .............................................. G06F 15/16
(52) U.S. Cl. ....................................... 709/233; 709/235
(58) Field of Search ................................. 709/233, 232, 709/236; 370/230, 232, 458

(56) References Cited

U.S. PATENT DOCUMENTS

| | | | |
|---|---|---|---|
| 5,210,829 A | | 5/1993 | Bitner |
| 5,274,644 A | | 12/1993 | Berger et al. |
| 5,282,202 A | | 1/1994 | Bernstein et al. |
| 5,426,640 A | * | 6/1995 | Hluchyj et al. ............. 370/235 |
| 5,530,695 A | * | 6/1996 | Dighe et al. ................ 370/232 |
| 5,611,049 A | | 3/1997 | Pitts |
| 5,689,508 A | * | 11/1997 | Lyles ......................... 370/391 |
| 5,734,825 A | | 3/1998 | Lauck et al. |
| 5,796,956 A | | 8/1998 | Jones |
| 5,838,994 A | | 11/1998 | Valizadeh |
| 5,844,890 A | * | 12/1998 | Delp et al. .................. 370/230 |
| 5,854,938 A | | 12/1998 | Ogi |
| 5,904,732 A | | 5/1999 | Greenley et al. |
| 5,983,329 A | | 11/1999 | Thaler et al. |
| 6,058,114 A | | 5/2000 | Sethuram et al. |
| 6,073,129 A | | 6/2000 | Levine et al. |
| 6,076,112 A | | 6/2000 | Hauser et al. |
| 6,084,856 A | | 7/2000 | Simmons et al. |
| 6,085,234 A | | 7/2000 | Pitts et al. |
| 6,128,623 A | | 10/2000 | Mattis et al. |
| 6,128,627 A | | 10/2000 | Mattis et al. |

(List continued on next page.)

OTHER PUBLICATIONS

Nicola, V.F. et al., "Fast simulation of the leaky bucket algorithm", ACM Proceedings of Simulation Conference, p 266–273, Dec. 1994.*

Kulkarni, V.G. et al., "Leaky buckets: sizing and admission control", IEEE Conference on Decision and Control, v 1, p 785–790, Dec. 1996.*

Parris, C. et al., "A Dynamic Management Scheme for Real–Time Connections", IEEE INFOCOM '94, ISBN: 0–8186–5570–4, pp. 698–707, Jun. 1994.

(List continued on next page.)

*Primary Examiner*—Jason D. Cardone
(74) *Attorney, Agent, or Firm*—Hickman Palermo Truong & Becker LLP (57) ABSTRACT

A mechanism for managing data communications is provided. A circularly arranged set of buckets is disposed between input buffers and output buffers in a networked computer system. Connections among the system and clients are stored in the buckets. Each bucket in the set is successively examined, and each connection in the bucket is polled. During polling, the amount of information that has accumulated in a buffer associated with the connection since the last poll is determined. Based on the amount, a period value associated with the connection is adjusted. The connection is then stored in a different bucket that is generally identified by the sum of the current bucket number and the period value. Polling continues with the next connection and the next bucket. In this way, the elapsed time between successive polls of a connection automatically adjusts to the actual operating bandwidth or data communication speed of the connection.

9 Claims, 4 Drawing Sheets

U.S. PATENT DOCUMENTS

| | | | |
|---|---|---|---|
| 6,209,003 B1 | | 3/2001 | Mattis et al. |
| 6,308,214 B1 | * | 10/2001 | Plevyak et al. .............. 709/233 |
| 6,324,165 B1 | * | 11/2001 | Fan et al. .................... 370/232 |
| 6,370,116 B1 | * | 4/2002 | Giroux et al. ............... 370/232 |
| 6,388,992 B2 | * | 5/2002 | Aubert et al. ............... 370/232 |
| 6,396,834 B1 | * | 5/2002 | Bonomi et al. ............. 370/394 |
| 6,532,213 B1 | * | 3/2003 | Chiussi et al. ........... 370/230.1 |

OTHER PUBLICATIONS

Matta, I. et al., "Type–of–Service Routing in Dynamic Datagram Networks", IEEE INFOCOM '94, ISBN: 0–8186–5570–4, pp. 992–999, Jun. 1994.

Neves, N. et al., "A Checkpoint Protocol for an Entry Consistant Shared Memory System", ACM PODC, pp. 121–129, Aug. 1994.

Hluchyj, M.G. et al., "A Second–Order Leaky Bucket Algorithm to Guarantee QoS in ATM Networks", IEEE GLOBECOM '96, ISBN: 0–7803–3336–5, pp. 1090–1096, Nov. 1996.

Pang, Q. et al., "Performance Study on the Priority Leaky Buckets", IEEE Sym. On Computers and Communications, ISBN: 0–8186–7852–6, pp. 254–258, Jul. 1997.

Lamti, L. et al., "The Fair Shaper", IEEE ATM Workshop Proceedings, ISBN: 0–7803–4874–5, pp. 56–64, May 1998.

* cited by examiner

SELF-TUNING DATAFLOW I/O CORE

RELATED APPLICATION

This application is a divisional to and claims priority of U.S. patent Ser. No. 09/159,468, entitled SELF-TUNING DATAFLOW I/O CORE, filed by John Plevyak. et al. on Sep. 23, 1998, now U.S. Pat. No. 6,308,214, the contents of which are herein incorporated by reference as if originally set forth herein.

FIELD OF THE INVENTION

The present invention relates to computer network communications, and relates more specifically to managing communications with a plurality of network connections that use different data communication rates.

BACKGROUND OF THE INVENTION

Several important computer technologies rely, to a great extent, upon rapid delivery of information from a central storage location to remote devices. For example, in the client/server model of computing, one or more servers are used to store information. Client computers or processes are separated from the servers and are connected to the servers using a network. The clients request information from one of the servers by providing a network address of the information. The server locates the information and transmits it over the network to the client, completing the transaction.

The World Wide Web is a popular application of the client/server computing model. A client, such as a computer or a software process such as a browser program, is connected to a global information network called the Internet, either directly or through an intermediary such as an Internet Service Provider, or an online information service. A server is likewise connected to the Internet. The client and server communicate using one or more agreed-upon protocols that specify the format of the information that is communicated. The server has a server name in an agreed-upon format that is indexed at a Domain Name Server (DNS). The client looks up the name of the server at the DNS and establishes a connection to the server using a communication protocol called the Hypertext Transfer Protocol (HTTP). A Uniform Resource Locator (URL) uniquely identifies each page of information stored on the server. A URL is a form of network address that identifies the location of information stored in a network. The logical path that connects a client to a server is called a connection. In practice, a connection is a set of data values that identify a hardware port, buffers, and storage areas that are dedicated to a particular path between client and server. A server can have many logical connections open and active at a given time.

In these and other contexts, a key factor that limits the performance of network communications among devices is the efficiency with which a central server can communicate information to a client. In a networked environment, it is common for different clients to connect to a single server using connections that have different data communication rates. For example, in a particular network or application a server can be connected to a first client by an Ethernet link that operates at 10 megabits per second (Mbps), to a second client by a modern link that operates at 28,800 bits per second (28.8 Kbps), and to a third client by an ISDN link having one or two 64 Kbps channels. In such case, matching the data communication speed of each connection to the input/output processing speed of a computer system is difficult.

When buffered data communications is used, fast memory mechanisms called buffers are interposed between the connections and the computer system. The connections fill the buffers with data at a rate proportional to the communication speed of the connection. Ideally, the system removes data from the buffers at the identical rate at which the buffers are filled, but in past approaches this has been impossible. A typical computer system draws data out of the buffers usually at a much higher speed. Because the computer system can draw data from the buffers far faster than the connection can fill the buffers, the computer system draws data from the buffers only periodically. The computer system performs other operations while waiting for the buffers to fill to an extent that makes the processing cost of accessing the buffers worthwhile. Generally, an efficient system removes data from the buffers at a rate that ensures that the buffers never become full. It is highly undesirable for data to sit idle in the buffers.

A number of past approaches have addressed this problem. In one prior approach, the server polls each of the connections one after another at a slow rate to minimize overhead. "Polling" means to examine the connection or a buffer associated with it, determine whether a packet of data has arrived or needs to be sent, and communicate the packet of data. Generally polling is carried out 5 to 100 times per second. The time interval that separates polls is fixed in two ways. First, the server always moves from one connection to the next in the same time interval. Second, the time between successive polls to the same connection is the same. The server uses a slow poll rate in order to reduce the total number of poll operations that are carried out. This approach provides low overhead, but adds latency and causes fast connections to suffer poor performance.

A second approach is to poll all connections quickly. This works well for fast connections, but imposes high overhead for slow connections. It also limits the overall number of connections that a single server or machine can manage. In particular, it is relatively expensive in terms of processing steps to check a connection that has no data. The check causes wasted processing steps or overhead.

The first and second approaches share a significant limitation. When the data connections have widely varying data communication rates, fast connections are not polled often enough, and slow connections are polled too often. This limitation is difficult to address because, generally, there is no way for the server to determine the data communication speed of a connection before the connection is established, or before data communications have actually occurred over the connection.

Another approach is to respond to each data packet as it arrives. An interrupt can be generated when data packets arrive and the server can respond to the interrupt. This approach is highly responsive, but in the World Wide Web context it is impractical, because in a single HTTP connection there are typically many packets. When each packet arrives, an interrupt is generated, and the system must save its current state, call an interrupt handler, process the packet, and return to the original state. This imposes very high overhead.

Thus, there is a need for a way to adjust the time interval between successive polls of a connection so that the time interval closely matches an ideal value that is related to the actual bandwidth of the connection.

There is also a need to provide a way for the server to adapt its polling behavior to each data connection among numerous connections that have widely differing data communication rates.

SUMMARY OF THE INVENTION

These and other needs are addressed by the present invention, which provides, in one embodiment, a method of managing a plurality of data communication connections having differing data communication rates, comprising the steps of A) assigning the data communication connections to a plurality of buckets that have a circular order; B) establishing a bucket of the plurality of buckets as a current bucket and another as a fast bucket; C) establishing a connection assigned to the current bucket as a current connection; D) communicating data over the current connection; E) in response to communicating data over the current connection, re-assigning the current connection to a different bucket of the plurality of buckets based upon the current bucket and a bandwidth estimation of the current connection; F) repeating steps (C), (D) and (E) for each connection assigned to the current bucket; G) establishing a next bucket as a new current bucket, wherein the next bucket follows the current bucket in the circular order; waiting for earlier of two events occurs: (1) any connection in the fast bucket is ready for communication, or (2) a predefined constant amount of time is elapsed; and H) repeating step (F) and (G) for each bucket of the plurality of buckets.

Another feature of the invention is to always place newly established connections in the "fast bucket", independent of the connections native period value, until a pre-specified number of bytes have been communicated on this connection.

Another feature of the invention is using the measured time to process connections in a bucket as a measure of system overload. In particular, if the time required to service connections in a bucket grows, the rate of new connection acquisition is reduced, so over commitment of system resources does not occur.

The invention also encompasses an apparatus, computer system, computer program product, and a computer data signal embodied in a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for managing data communications is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

MANAGING NETWORK COMMUNICATIONS

Figure 1:
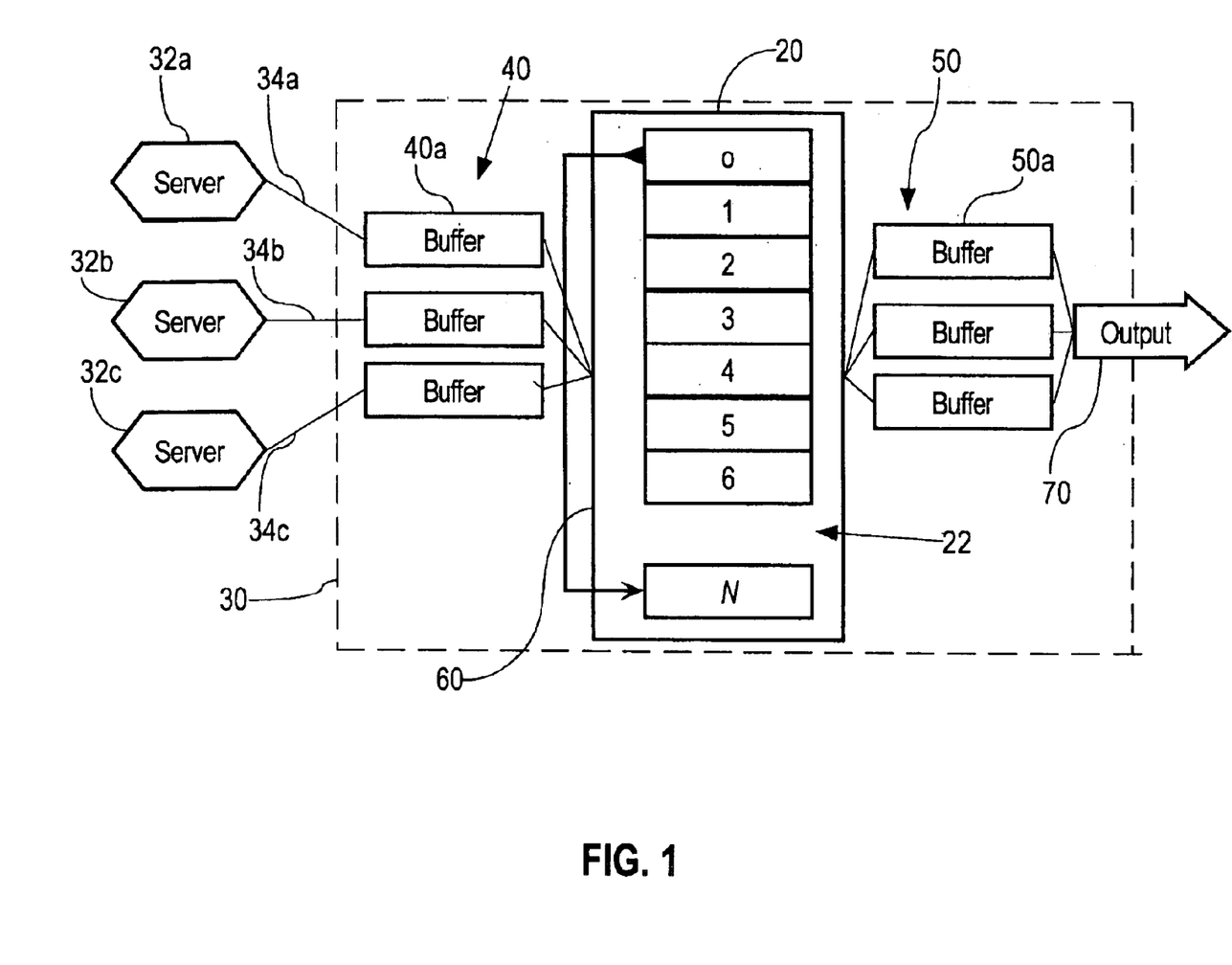
FIG. 1 is a block diagram of the structure of certain elements of a dataflow core according to the invention.

FIG. 1 is a block diagram of a portion of a computer system 30 that receives and responds to buffered network communications. Servers 32a, 32b, and 32c are connected to the computer system 30 using network links 34a, 34b, 34c respectively. Although three pairs of servers and connections are shown in FIG. 1, by way of example, the invention is useful with any number of servers or connections. In this context, the term "server" as used for servers 32a, 32b, 32c refers broadly to a remote computing device of any type.

Each of the network connections 34a, 34b, 34c terminates at one of a plurality of input buffers 40 in the computer system 30. For example, network connection 34a is coupled to buffer 40a. The buffers 40 are small, high-speed temporary memory areas. In conventional fashion, when one of the network connections 34a, 34b, 34c is active and providing data to the computer system 30, data from the network connection fills the corresponding buffer at a rate defined by the network connection. The computer system 30 removes information from the buffer and processes the data at another rate, which is usually faster than the rate at which the buffer is filled.

After information from the input buffers is processed by other elements of the computer system 30, the information is provided to one or more output buffers 50. The output buffers 50 deliver the information to an output 70, which may be a network connection, another computer device, or a software process within or external to the computer system 30.

The computer system 30 also may include transformation mechanisms logically located between the input buffers 40 and the output buffers 50. For example, the computer system 30 can include filters or drivers that re-format information arriving in one of the input buffers 40 A list 20 of connection buckets 22 is stored in the computer system 30, logically interposed between input buffers 40 and output buffers 50. Each of the connection buckets 22 has a unique number ranging from 0 to n=1, where n is the total number of buckets. In the example of FIG. 1, n is 16, and the buckets are numbered 0 to 15. For clarity, in FIG. 1 buckets numbered 7 to 14 are omitted.

In the preferred embodiment, 128 buckets are used. The number of buckets is not critical and can be adjusted according to the context in which the invention is used, the processing capacity of a server that is using the invention, and other factors.

In FIG. 1, the list 20 is shown in the form of a linear list in which the last bucket 15 has a reference 60 that refers or points back to the first bucket 0. Thus, the list 20 has a linked or circular arrangement. The list 20 can be implemented using conventional linear data structures, in combination with methods or procedures that cause the list to behave as if it had a physically circular structure.

Each of the buckets 22 is assigned zero or more connections. In this context, the term "connection" refers to an identifier of a set of data values that describe a communication path between a client and the computer system 30. For example, in the case of connection 34a, a connection is a collection of data values including the port number of the connection 34a, the size of the buffer 40a, the protocol used to start and stop a data flow from the buffer 40a, and other information.

Figure 2:
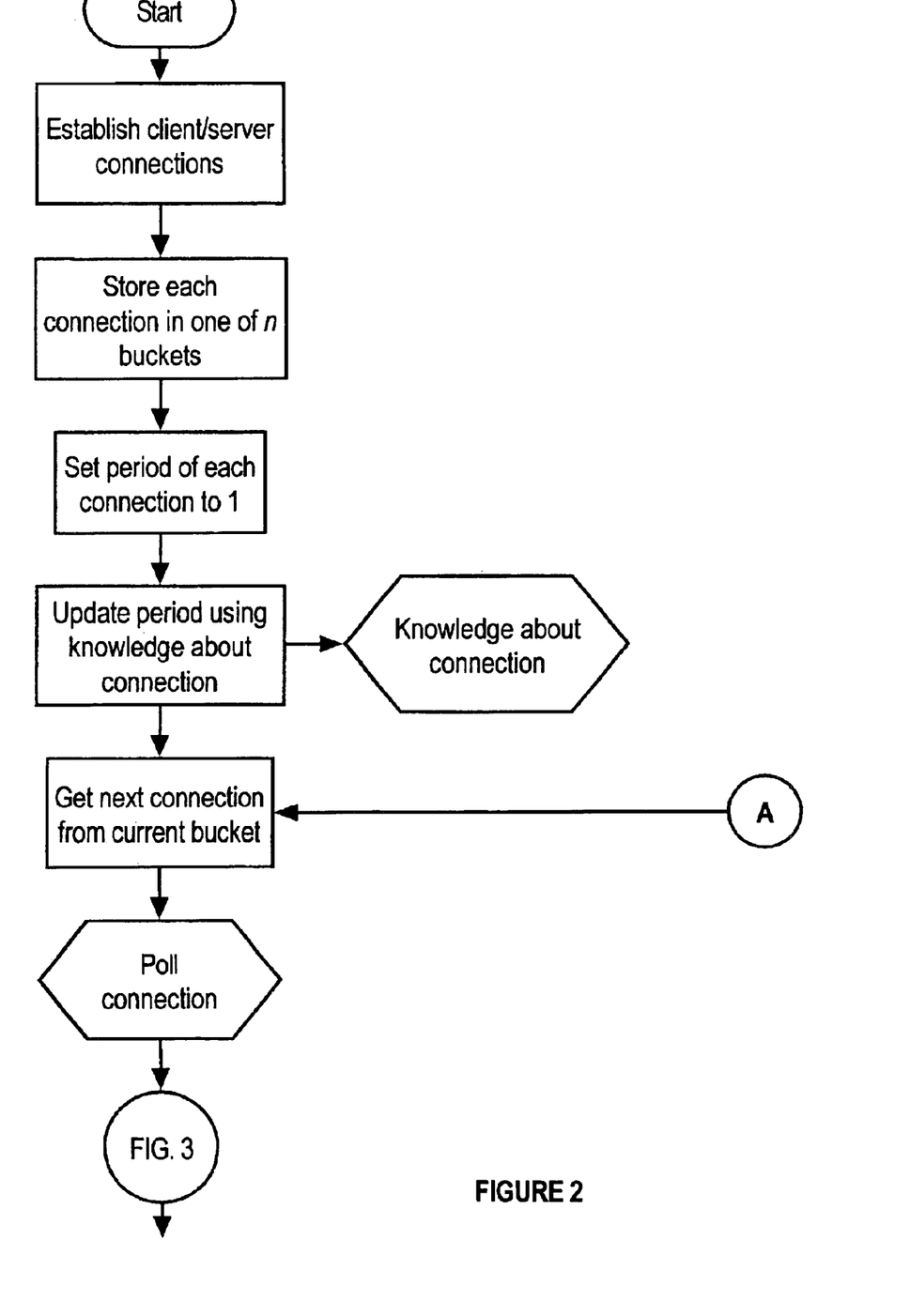
FIG. 2 is a block diagram of a method of managing data communications using the dataflow core of FIG. 1.

FIG. 2 is a block diagram of a method of managing data communications that can be carried out using the arrangement of FIG. 1. Generally, the method involves identifying a current bucket; polling each connection in the current bucket; re-assigning each connection to a new bucket based upon the estimated bandwidth of the connection; and moving to the next bucket.

In step 100, connections or other communication paths are established with one or more clients or servers. Concurrently, for each network link or communication path, a connection is stored in memory. In step 102, each of the connections is stored in one of a set of buckets, such as buckets 22 of FIG. 1.

Each connection has a period value associated with the connection. The period value, when added to the current bucket number in which the connection is stored, indicates the bucket number to which the connection is to be moved once it has been polled. Thus, the period indicates the number of buckets by which the connection should be advanced in the polling order. A smaller period value is associated with a fast connection. A larger period value is associated with a slow connection.

In step 104, a period value of one (1) is stored in association with each of the connections. Thus, the initial polling period for each of the connections is one (1). Optionally, in step 106, for each connection the period value is updated using knowledge about the connection, if such knowledge is available, as indicated in block 108. Sources of such knowledge, and the use of such knowledge in updating the period value, are discussed below.

In step 110, the next connection in the current bucket is retrieved. The identities of the next connection and the current bucket are managed using appropriate identifying information. For example, a connection counter is set to identify the current connection within a bucket, and a current bucket value is set to reference the current bucket number. Initially, the current bucket is bucket number zero.

In step 112, the current connection in the current bucket is polled. Thus, the contents of a buffer associated with the connection are obtained and passed on for further processing by other elements of the system. In addition, the number of bytes accumulated in the buffer is determined.

Each time a connection is polled, its period is updated, the period is added to the current bucket value to generate a next bucket value, and the connection is assigned to a new bucket identified by the next bucket value. Typically, the period is allowed to change modestly per poll, so that the period does not overreact, in effect, to temporary changes in the performance of the network. The amount to change the period is computed using two values called a high-water mark and a low-water mark. The high-water mark and the low-water mark are constants that enable the period increment value to be determined based on the amount of data accumulated in the buffer associated with the connection since the last poll. In the preferred embodiment, the priorities change multiplicatively, increasing by 25%, and decreasing by 50%.

Figure 3:
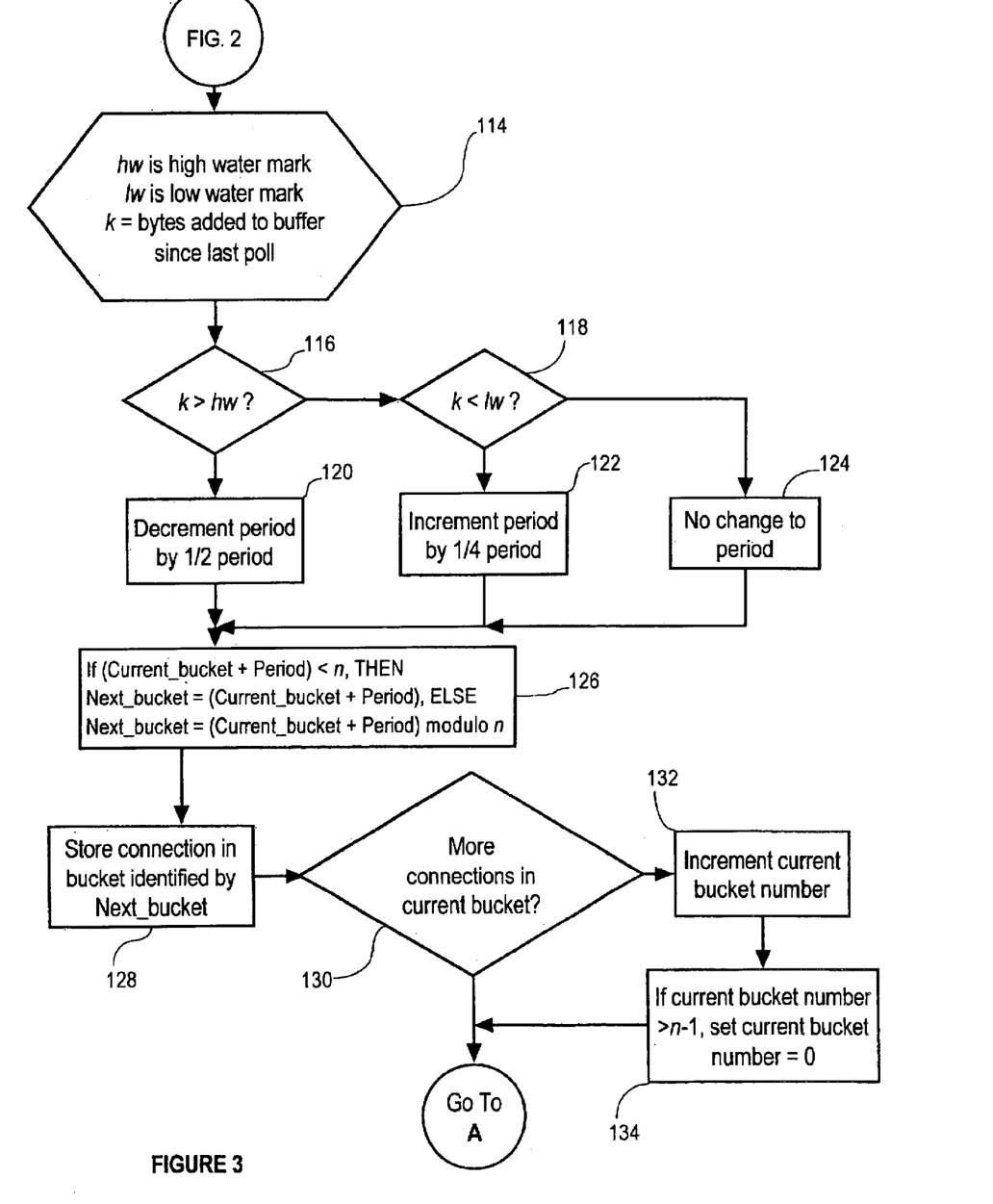
FIG. 3 is a block diagram of further steps in the method of FIG. 2.

For example, as shown in block 114 of FIG. 3, let hw be the high water mark in bytes and let lw be the low water mark in bytes. Let k be the number of bytes that have accumulated in the buffer associated with a connection since the last time the connection was polled. The value of k is determined each time that a connection is polled. If k is greater than hw, as tested in block 116, then polling is occurring too infrequently for the connection. Therefore, the period is decreased as indicated by block 120. If k is less than lw, as tested in block 118, then the polling rate is too high, and the period is increased, as indicated by block 122. If k is between hw and lw, then the period is not changed, as indicated in block 124.

Accordingly, for a slow connection such as a modem connection, the initial value of the period value generally will be too low. However, it will increase with each poll, until the period value matches the actual bandwidth of the connection.

The period value must be less than or equal to n. Accordingly, the minimum number of buckets is determined by the frequency of polling (in buckets per second) multiplied by the worst-case expected bandwidth (measured in seconds). Preferably, the period is updated by a mechanism that ensures that the period for any given connection is at least 1 and at most n.

In an alternate embodiment, the period value can be initially set or adjusted based upon information about the connection. For example, if the context in which the invention is used can provide advance information about the type of a connection, then an appropriate initial period value can be assigned. Thus, if a new connection is known to be a fast connection, in advance of any data communication occurring, then the initial period value is appropriately set. Information about connection types can be obtained from several sources. For example, a database coupled to the system can store a table of every user and host to which the server has connected in the recent past, with information about the types of connections used by those users and hosts. Alternatively, the information can be received from a router that forms a part of the connection. If the connection is arriving from an Internet Service Provider (ISP), the ISP may provide information about the connection.

The absence of such information is not a significant disadvantage, because the period value will quickly converge on the right rate.

In block 126, the next bucket number, in which the current connection will be stored for subsequent polling, is computed. Table 1 provides an example of how the next bucket number is computed, based upon the period of three connections A, B, and C that are stored in bucket number 2, each of which have a different data communication rate:

TABLE 1

NEXT BUCKET NUMBER COMPUTATION

| CONNECTION | BUCKET | PERIOD | NEXT BUCKET |
|---|---|---|---|
| A (Ethernet) | 2 | 2 | 4 |
| B (modem) | 2 | 11 | 13 |
| C (cluster) | 2 | 1 | 3 |

The next bucket value is calculated based on a modulus of n−1, where n is the number of buckets and the buckets are numbered from zero to n. In effect, this causes the next bucket value to "wrap around" when the next bucket value is computed to be greater than n−1. For example, if connection B in Table 1 was stored in bucket 8, for n=16, the next bucket value would be 4:

bucket [8]+period [11]=next bucket [19]

next bucket [19]−n−1[15]=4

Thus, the next bucket value is given by the relationships:

if (current bucket number+period<n)

then next bucket number=current bucket number+period else next bucket number=(current bucket number+period)*mod n*

This relationship is shown in block 126.

In step 128, the current connection is assigned to the bucket identified by the next bucket number.

A fixed time interval elapses between polling connections in one bucket and polling connections in the next bucket. Accordingly, the effect of moving a connection from one bucket to another bucket is to select the amount of time that elapses between successive polls to the same connection. Let a particular connection be stored in bucket 2. After polling, if the bucket is moved to bucket 3 based on the above relationship, it will be polled again relatively soon. However, if the equation above causes it to be moved to bucket 15, far more time will elapse before the next poll because the system will poll all the connections in buckets 3 through 14 before getting to bucket 15. During the passage of that time, the input buffer associated with the connection will fill with a larger amount of data. In this way, movement of a connection from one bucket to another enables the system to self-tune to the bandwidth of a connection.

In step 130, the current bucket is examined to determine whether it contains more connections. If it does, control is transferred back to step 110 to retrieve and process the next connection according to the steps described above. If a next connection counter is maintained, it is incremented.

If there are no more connections in the current bucket, as indicated in step 132, the current bucket number is incremented so that processing will proceed to the connections in the next bucket. If this incrementing step causes the current bucket number to become greater than the total number of buckets, as shown in block 134, then the current bucket number is reset to zero. In effect, this causes processing to "wrap around" to the first bucket after the last bucket is processed. Thereafter, control is passed to step 110 to enable the next connection in the bucket to be processed.

Variations and Alternatives

Multiple Input Connections

In an alternate embodiment, more than one connection is coupled from one of the input buffers 40 to the computer system 30, and each of the connections has a different polling rate and is assigned to a different bucket. This embodiment is advantageous, for example, when one connection is delivering compressed data to the computer system 30 and the other is delivering uncompressed data.

Fast bucket

In another alternate embodiment, the dataflow core includes a special "fast bucket". Connections in this fast bucket are processed specially. Instead of waiting for a fixed time interval between repeating steps (F) and (G), an adaptive time delay is incurred until the earlier of two events occurs: (1) any connection in the fast bucket is ready for communication, or (2) a predefined constant amount of time is elapsed.

In yet another alternative embodiment, newly established connections are always placed in the "fast bucket", independent of the connection's native period value, until a pre-specified number of bytes have been communicated on the new connection. For communication substrates such as TCP network channels, using this scheme effective bandwidth improves initially as data packets are transacted, and as buffer space and environmental dynamics are negotiated. Further, this mechanism reduces the latent time required to "initialize" the underlying communication channels to the maximum throughput, by rapidly exchanging packets regardless of the native period of the connection.

Overload Control

In another alternate embodiment, the measured time to process connections in a bucket is used as a measure of system overload. In particular, if the time required to service connections in a bucket grows, the rate of new connection acquisition is reduced, so over-commitment of system resources does not occur.

Second Level Adaptation

Yet another feature is the use of second level adaptation. While the basic system adapts to connection bandwidth dynamics, and new connection startup effects, a meta-adaptation mechanism adapts high-level scheduling parameters based on systemic conditions. The system adapts between 3 scheduling algorithms called ADAPT, POLL, and WAIT dynamically. The ADAPT scheme is that which is described in this document above. In the POLL scheme, all connections are queried for I/O readiness continually, by back-to-back polls. In the WAIT scheme, an interval of time elapses between polls.

Preferably, a meta-adaptation system switches between these schemes based on system characteristics such as the availability of CPU resources. For example, the system initially uses the POLL scheme, which is the most CPU intensive. The system then selects the ADAPT scheme as CPU load increases. Finally, if the system becomes overloaded and minimal processor resources are available, the WAIT scheme is selected.

In one embodiment, POLL is used until at least 25% of the system CPU is busy. At this point ADAPT is used until the time required to process connections in a bucket becomes excessive, exceeding a predetermined multiple of the period length. In the preferred embodiment, ADAPT is used until the time required to process connections in a bucket exceeds ten (10) times the period length. This meta-adaptation minimizes latency under low-load conditions, provides efficient transfers for normal operating regimes, and prevents system overload by over-commitment.

Hardware Overview

Figure 4:
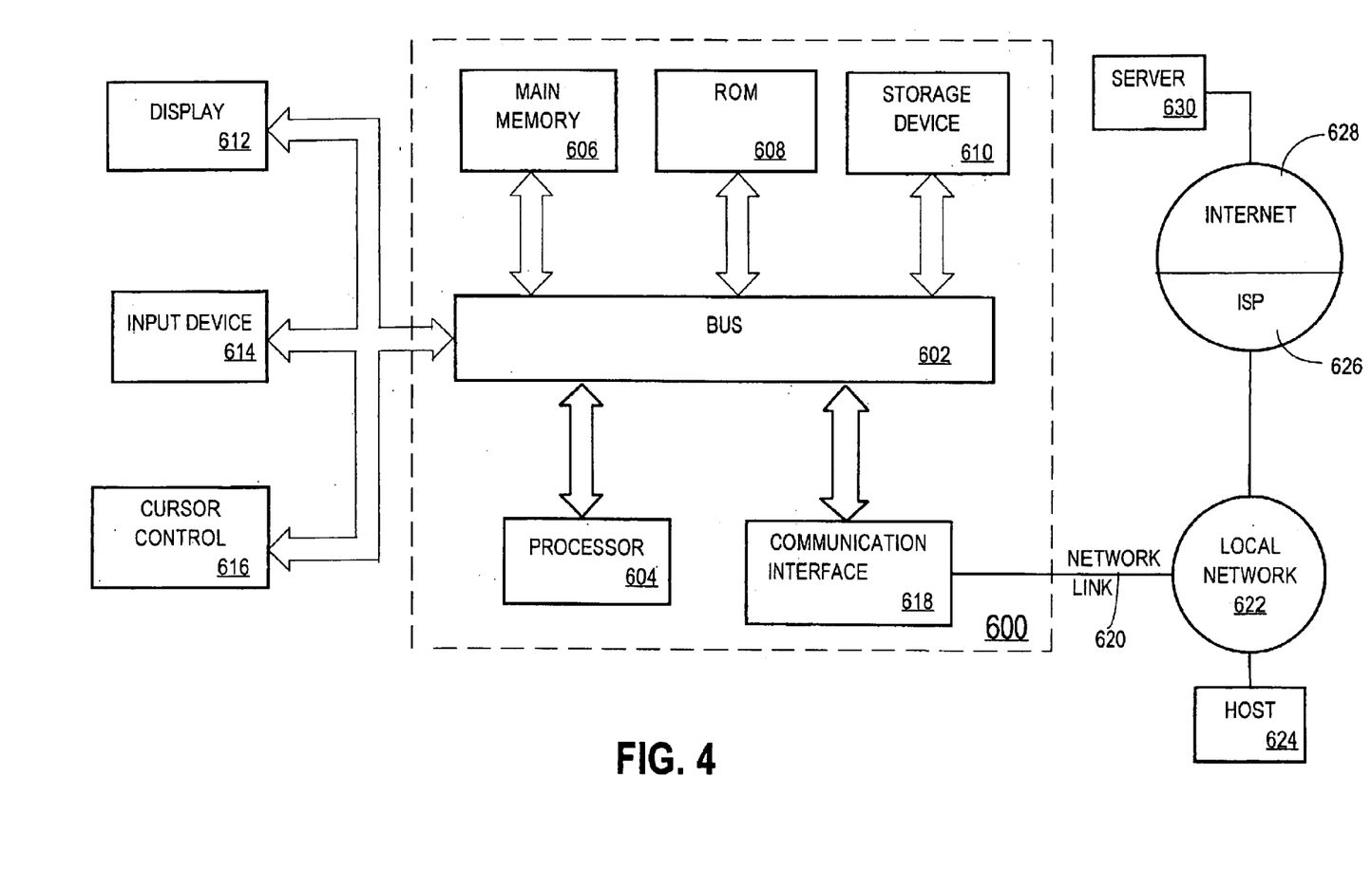
FIG. 4 is a block diagram of a computer system that can be used to implement the present invention.

FIG. 4 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for managing data communications. According to one embodiment of the invention, managing data communications is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for managing data communications as described herein.

The received code may be executed by processor 604 as it is received, and/or stored in storage device 610, or other non-volatile storage for later execution. In this manner, computer system 600 may obtain application code in the form of a carrier wave.

The invention preferably is implemented using a computer system that runs an operating system providing support for asynchronous input and output. The mechanisms and methods of the invention can be implemented in one or more computer programs that are compiled into an application program that uses the mechanisms and methods of the invention. In that context, the polling steps are carried out by calling operating system calls that provide asynchronous I/O services. The buffers can be stored in volatile memory or non-volatile storage such as disk storage.

Accordingly, a self-tuning dataflow core, including a method of data communications, has been described that automatically adapts a polling rate individually for each of many connections, based on the recent bandwidth for that connection. This approach provides fast response time for high-speed connections, and also imposes minimal overhead for slow connections, which are polled less frequently. Additionally, the approach optimizes new connection start-up effects and adapts to system load, leading to improved responsiveness while moderating the use of system resources.

Ideally, each connection is checked only when it has a reasonable amount of data available to receive. That amount of data is conceived as high enough to make the processing cost of polling the connection worthwhile, but low enough such that a connection is not significantly delayed waiting for the proxy. By reducing the overhead for slow connections, the invention allows a server to manage a larger number of connections with better overall performance.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer system, comprising:

a processor, and a memory coupled to said processor, said memory comprising one or more sequences of instructions for managing a plurality of data communication connections having differing data communication rates, wherein execution of the one or more sequences of instructions by said processor causes the processor to perform the steps of:

A) assigning said data communication connections to a plurality of buckets that have a circular order;

B) establishing a bucket of said plurality of buckets as a current bucket and establishing another bucket as a fast bucket;

C) establishing a connection assigned to said current bucket as a current connection;

D) communicating data over said current connection;

E) in response to communicating data over said current connection, re-assigning said current connection to a different bucket of said plurality of buckets based upon where said current bucket resides in said circular order and a bandwidth estimation of said current connection;

F) repeating steps (C), (D) and (E) for each connection assigned to said current bucket;

G) establishing a next bucket as a new current bucket, wherein said next bucket follows said current bucket in said circular order;

waiting until the earlier of (1) when any connection in the fast bucket is ready for communication or (2) when a pre-defined period of time elapses; and H) repeating step (F) and (G) for each bucket of said plurality of buckets.

2. The computer system recited in claim 1, wherein the steps further comprise always placing each newly established connection in the fast bucket until a pre-determined number of bytes have been communicated on the newly established connection.

3. The computer system recited in claim 1, wherein the steps further comprise:

measuring time elapsed in processing connections in a bucket; and reducing a rate of establishing the connections when the measured time increases.

4. A method of managing a plurality of data communication connections having differing data communication rates, comprising:

A) assigning said data communication connections to a plurality of buckets that have a circular order;

B) establishing a bucket of said plurality of buckets as a current bucket and establishing another bucket as a fast bucket;

C) establishing a connection assigned to said current bucket as a current connection;

D) communicating data over said current connection;

E) in response to communicating data over said current connection, re-assigning said current connection to a different bucket of said plurality of buckets based upon where said current bucket resides in said circular order and a bandwidth estimation of said current connection;

F) repeating steps (C), (D) and (E) for each connection assigned to said current bucket;

G) establishing a next bucket as a new current bucket, wherein said next bucket follows said current bucket in said circular order;

waiting until the earlier of (1) when any connection in the fast bucket is ready for communication or (2) when a pre-defined period of time elapses; and repeating step (F) and (G) for each bucket of said plurality of buckets.

5. The method recited in claim 4, further comprising always placing each newly established connection in the fast bucket until a pre-determined number of bytes have been communicated on the newly established connection.

6. The method recited in claim 4, further comprising:

measuring time elapsed in processing connections in a bucket; and reducing a rate of establishing the connections when the measured time increases.

7. A computer-readable medium carrying one or more sequences of instructions for managing a plurality of data communication connections having differing data communication rates, wherein execution of the one or more sequences of instructions by one or more processors causes the one or more processors to perform the steps of:

A) assigning said data communication connections to a plurality of buckets that have a circular order;

B) establishing a bucket of said plurality of buckets as a current bucket and establishing another bucket as a fast bucket;

C) establishing a connection assigned to said current bucket as a current connection;

D) communicating data over said current connection;

E) in response to communicating data over said current connection, re-assigning said current connection to a different bucket of said plurality of buckets based upon where said current bucket resides in said circular order and a bandwidth estimation of said current connection;

F) repeating steps (C), (D) and (E) for each connection assigned to said current bucket;

G) establishing a next bucket as a new current bucket, wherein said next bucket follows said current bucket in said circular order;

waiting until the earlier of (1) when any connection in the fast bucket is ready for communication or (2) when a pre-defined period of time elapses; and H) repeating step (F) and (G) for each bucket of said plurality of buckets.

8. The computer readable media recited in claim 7, wherein the steps further comprise always placing each newly established connection in the fast bucket until a pre-determined number of bytes have been communicated on the newly established connection.

9. The computer readable media recited in claim 7, wherein the steps further comprise:

measuring time elapsed in processing connections in a bucket; and reducing a rate of establishing the connections when the measured time increases.

* * * * *